(12) United States Patent
Schumann et al.

(10) Patent No.: US 12,313,830 B2
(45) Date of Patent: May 27, 2025

(54) METHOD FOR ADJUSTING THE ILLUMINATION IN A FLUORESCENCE MICROSCOPE, AND CORRESPONDING FLUORESCENCE MICROSCOPE

(71) Applicant: LEICA MICROSYSTEMS CMS GMBH, Wetzlar (DE)

(72) Inventors: Christian Schumann, Wetzlar (DE); Benjamin Deissler, Wetzlar (DE); Kai Ritschel, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 366 days.

(21) Appl. No.: 18/040,154

(22) PCT Filed: Aug. 5, 2020

(86) PCT No.: PCT/EP2020/072057
§ 371 (c)(1),
(2) Date: Feb. 1, 2023

(87) PCT Pub. No.: WO2022/028694
PCT Pub. Date: Feb. 10, 2022

(65) Prior Publication Data
US 2023/0324662 A1    Oct. 12, 2023

(51) Int. Cl.
*G02B 21/00* (2006.01)
(52) U.S. Cl.
CPC ..... *G02B 21/0076* (2013.01); *G02B 21/0032* (2013.01); *G02B 21/0084* (2013.01)

(58) Field of Classification Search
CPC ............ G02B 21/0076; G02B 21/0032; G02B 21/0084; G02B 21/00; G02B 21/0004;
(Continued)

(56) References Cited

U.S. PATENT DOCUMENTS 7,593,158 B2 * 9/2009 Wilhelm ............ G02B 21/0076
359/385
8,294,897 B2 10/2012 Power
(Continued)

FOREIGN PATENT DOCUMENTS

| CA | 2484336 C | * 6/2012 | ................ G01J 3/10 |
| CN | 107064082 A | 8/2017 | |

(Continued)

*Primary Examiner* — Arnel C Lavarias
(74) *Attorney, Agent, or Firm* — LEYDIG, VOIT & MAYER, LTD.

(57) ABSTRACT

A method for automatically ascertaining illumination brightnesses to be adjusted of at least two light sources for exciting at least one respective fluorophore in a sample to be imaged in a fluorescence microscope includes separately controlling, in terms of illumination brightness, each of the at least two light sources, detecting an image intensity of a microscopically imaged sample with at least two detectors, and automatically ascertaining the illumination brightnesses to be adjusted of the at least two light sources in such a way that a predefined setpoint of a signal-to-noise ratio is reached for each fluorophore. In order to ascertain the illumination brightnesses of the at least two light sources, cross-talk of a detector for different emission spectra of the fluorophores and/or cross-excitation of a fluorophore for different illumination spectra of the light sources are/is taken into account.

20 Claims, 3 Drawing Sheets

(58) Field of Classification Search
CPC .............. G02B 21/002; G02B 21/0052; G02B 21/0064; G02B 21/008; G02B 21/06; G02B 21/36; G02B 21/361; G02B 21/365; G02B 21/367; G01N 21/6428; G01N 21/6456; G01N 21/6458; G01N 2021/6463; G01N 21/6486; G01N 2021/6495; G01N 2021/6497
USPC ................ 359/385, 362, 363, 368, 369, 388
See application file for complete search history.

(56) References Cited

U.S. PATENT DOCUMENTS

| | | |
|---|---|---|
| 10,200,625 B2 | 2/2019 | Marcelpoil et al. |
| 10,310,243 B2 | 6/2019 | Anhut et al. |
| 10,914,680 B2 | 2/2021 | Wang et al. |
| 2007/0133086 A1 | 6/2007 | Wilhelm et al. |
| 2014/0093948 A1* | 4/2014 | Durrer .................. G01N 21/17 362/555 |
| 2018/0196246 A1 | 7/2018 | Bares et al. |
| 2022/0373464 A1* | 11/2022 | Ritschel ............. G02B 21/0032 |

FOREIGN PATENT DOCUMENTS

| | | | | |
|---|---|---|---|---|
| CN | 108181282 A | | 6/2018 | |
| EP | 1598688 A2 | | 11/2005 | |
| EP | 1795938 A2 | | 6/2007 | |
| EP | 2253983 A2 | | 11/2010 | |
| JP | 2001/116696 A | | 4/2001 | |
| JP | 2005283264 A | * | 10/2005 | ......... G01N 21/6408 |
| JP | 2010/092041 A | | 4/2010 | |
| WO | 0201222 A2 | | 1/2002 | |

* cited by examiner

METHOD FOR ADJUSTING THE ILLUMINATION IN A FLUORESCENCE MICROSCOPE, AND CORRESPONDING FLUORESCENCE MICROSCOPE

CROSS REFERENCE TO RELATED APPLICATIONS

This application is a U.S. National Phase application under 35 U.S.C. § 371 of International Application No. PCT/EP2020/072057, filed on Aug. 5, 2020. The International Application was published in German on Feb. 10, 2022 as WO 2022/028694 A1 under PCT Article 21(2).

FIELD

The present invention relates to a method for automatically ascertaining illumination brightnesses to be adjusted of at least two light sources for exciting at least one respective fluorophore in a sample to be imaged in a fluorescence microscope, and to a corresponding fluorescence microscope.

BACKGROUND

In fluorescence microscopy, samples stained with fluorophores are microscopically imaged. Fluorophores are dyes which are excited by the frequency of an excitation light to emit radiation themselves. Typically, each fluorophore requires a light source of suitable wavelength or a light source from whose emission spectrum the appropriate wavelength is filtered out. The fluorescent light emitted by the sample is received by a suitable detector. In this process, typically, the fluorescent radiation of each fluorophore is detected separately. This, in turn, may be accomplished using individual detectors of correspondingly narrow-band sensitivity or using a broad-band detector with an upstream filter that allows only the wavelength of the respective fluorescent radiation to pass therethrough. With regard to further details of the design and functioning of a fluorescence microscope, reference is made to the relevant literature. Fluorescence microscopes are used in particular for examining cells, in particular living cells.

U.S. Pat. No. 10,200,625 B2 describes a system and a method for imaging biological samples in a culture medium. Initially, an image of the sample is acquired with preset values. The system then determines, on a pixel-by-pixel basis, saturated pixels and a signal-to-noise ratio. If the number of saturated pixels is above a predetermined threshold value, or if the signal-to-noise ratio for the respective pixel is below a predetermined threshold value, a new image is acquired using new values for the photon flux and exposure time settings. This procedure is repeated until a predefined threshold value of the signal-to-noise ratio is reached for the non-saturated pixels, or until a predetermined maximum image acquisition time has elapsed. In the publication cited, the term "photon flux" is used to refer to the light intensity, which refers to the number of photons that reach the sensor of the camera per unit area and time. The exposure time is the time over which the sensor of the camera integrates the signal.

A user can use this method or another known method in a fluorescence microscope to adjust the illumination brightnesses of the available light sources for exciting the respective fluorophores. It has been found that this method is complex and tedious to perform, especially for inexperienced users, and mostly does not produce the desired high image quality.

Therefore, there is a need for a user-friendly, in particular automatically performed adjustment of microscope parameters, such as the illumination brightness of an excitation light source, in a fluorescence microscope.

SUMMARY

In an embodiment, the present disclosure provides a method for automatically ascertaining illumination brightnesses to be adjusted of at least two light sources for exciting at least one respective fluorophore in a sample to be imaged in a fluorescence microscope, comprising separately controlling, in terms of illumination brightness, each of the at least two light sources, detecting an image intensity of a microscopically imaged sample with at least two detectors, and automatically ascertaining the illumination brightnesses to be adjusted of the at least two light sources in such a way that a predefined setpoint of a signal-to-noise ratio is reached for each fluorophore, wherein in order to ascertain the illumination brightnesses of the at least two light sources, cross-talk of a detector for different emission spectra of the fluorophores and/or cross-excitation of a fluorophore for different illumination spectra of the light sources are/is taken into account.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
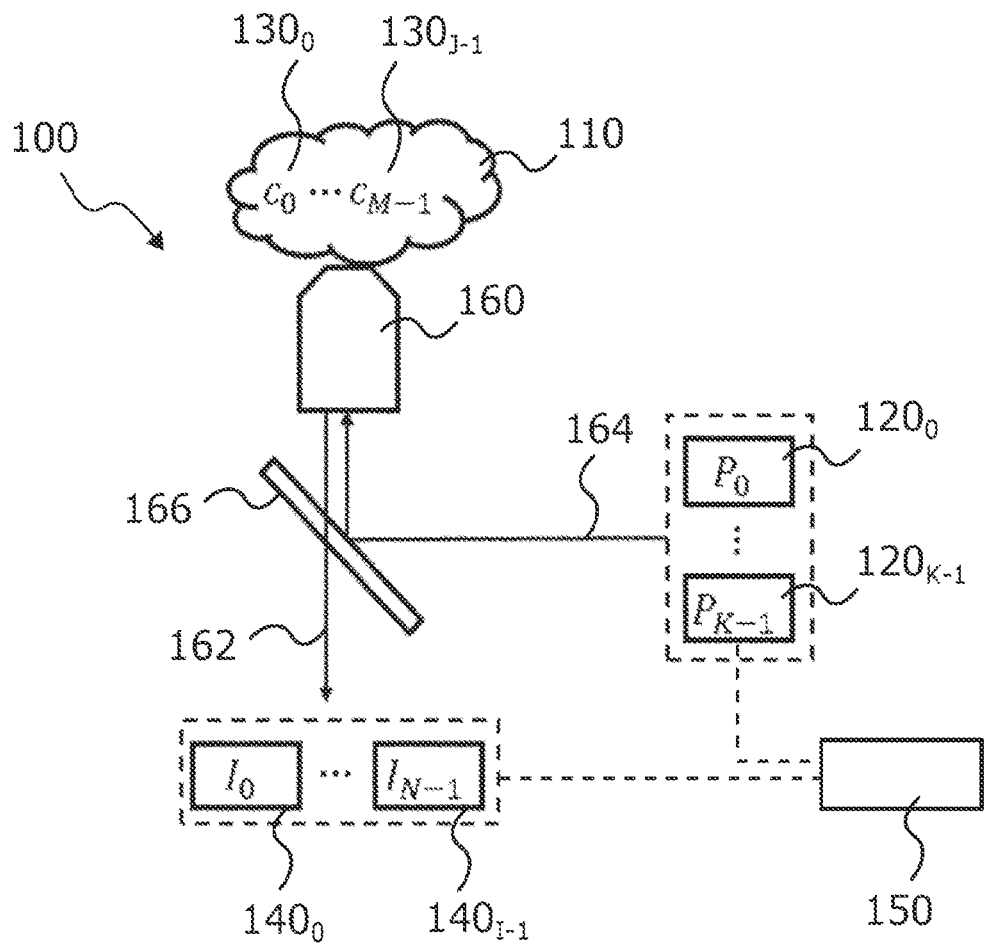
FIG. 1 illustrates a schematic view of a fluorescence microscope according to an embodiment of the invention.

One of the reasons for the difficulty in optimally adjusting the microscope parameters in fluorescence microscopy resides in the presence of cross-talk into different detection channels during the detection of multiple dyes/fluorophores and in the cross-excitation of multiple dyes/fluorophores by different light sources. In the following, cross-talk into different detection channels will also be referred to as "cross-emission" (which may also be referred to as "crosstalk" of the detectors).

Embodiments of the invention include a method for automatically ascertaining illumination brightnesses to be adjusted of at least two light sources for exciting at least one respective fluorophore in a sample to be imaged in a fluorescence microscope, wherein each of the at least two light sources is separately controllable in terms of its illumination brightness, and wherein at least two detectors each detect an image intensity of the microscopically imaged sample, wherein the illumination brightnesses to be adjusted of the at least two light sources are automatically ascertained in such a way that a predefined setpoint of a signal-to-noise ratio is reached for each fluorophore, wherein in order to ascertain the illumination brightnesses of the at least two light sources, cross-talk of a detector for different emission spectra of the fluorophores and/or cross-excitation of a fluorophore for different illumination spectra of the light sources are/is taken into account.

In the following description, the term "light source" includes any light-emitting arrangement capable of exciting a fluorophore, also referred to as "dye." In order to excite a fluorophore, a predetermined excitation wavelength must be present in the spectrum of the light source. Thus, the "light source" according to the present application may include a broad-band light source containing the excitation wavelength, a narrow-band light source containing the excitation wavelength, or a light source with a downstream filter that filters a spectrum containing the excitation wavelength out of the spectrum of the light source. Conversely, the same applies analogously to the "detector" according to the present application. This detector must be capable of detecting the wavelength of the fluorescent radiation emitted by the respective fluorophore. For this purpose, it is possible to use a correspondingly broad-band detector or a correspondingly narrow-band detector having sufficient sensitivity for the respective wavelength of the fluorescent radiation. It is also possible to use a broad-band detector with an upstream filter, the filter filtering the respective wavelength of the fluorescent radiation and making it available to the sensor of the detector. The mentioned filters downstream of the light sources or upstream of the detectors may be configured as a filter wheel or a filter slide, as spectrum-splitting layers, spectrometer or monochromator arrangements, or also in the form of, for example, acousto-optical or liquid-crystal-based systems.

Each light source according to the present application is provided to directly excite a fluorophore that is assumed by the user to be present in the sample to be imaged. Each of these light sources is individually adjustable in terms of its illumination brightness. Thus, it is possible to adjust the photon flux incident on the directly associated fluorophore, and thus also the resulting photon flux from the fluorescent radiation which ultimately impinges on the detector. In accordance with an embodiment of the invention, this adjustment accounts for the fact that a particular light source, due to its emitted spectrum, excites not only the fluorophore directly associated therewith, but to a certain extent also other fluorophores present in the sample. As will be explained further below, this cross excitation can be accounted for by ascertaining it during the process of adjusting the illumination brightnesses.

Alternatively or additionally, in order to ascertain the illumination brightnesses of the at least two light sources according to the present application, account is taken of the fact that, due to its sensitivity spectrum, a detector according to the present application that is associated with a particular fluorophore detects also fluorescent radiation from other fluorophores. As will be explained further below, this cross-emission can be accounted for by ascertaining the degree of this cross-talk during the adjustment of the illumination brightnesses of the light sources.

Thus, in summary, in accordance with embodiments of the invention, the illumination brightnesses of the light sources are adjusted in such a way that, accounting for cross-emission and/or cross-talk, a predefined setpoint of a signal-to-noise ratio is reached for each fluorophore. Thus, in summary, in accordance with embodiments of the invention, the user is substantially relieved of having to perform a tedious and complex adjustment of the microscope parameters in fluorescence microscopy. The implementation of the concept by way of a fast converging algorithm also minimizes the number of images to be acquired, and thus the light load on samples which are susceptible to bleaching, as well as phototoxicity in living cell microscopy.

It should be noted that the term "ascertain" is meant to include both "calculate" and "experimentally determine" as well as mixed forms thereof. This may also include "estimation" if the mathematical models are too complex and an estimation therefore provides faster results. An "estimation" may also mean a statistical estimation.

Fluorescence microscopy may, for example, operate with different parameters whose target values are selected by a user and/or by the system and which ultimately can be set by the system itself. Possible parameters are "speed," namely the speed of imaging, which is influenced, in particular, by the setting of the exposure time, as well as "image quality," which is largely influenced by the signal-to-noise ratio of the image. The number of detected photons or generated photoelectrons that are attributable to a fluorophore plays a most important part in this connection. Since photons follow Poisson statistics, the signal-to-noise ratio is substantially proportional to the square root of the detected photoelectrons that are attributable to a fluorophore, and thus to the square root of the detected image intensity per fluorophore. Another possible parameter is the "load on the sample." Bleaching is a sign of the load imposed on the sample by the illumination of the sample to be examined.

In an embodiment, an approach is provided to optimize the image quality at a constant speed of imaging and to use the load imposed on the sample as a termination criterion. Further explanations in this regard are given further below in the description. The optimization of image quality will be discussed first.

It is advantageous to ascertain the signal-to-noise ratio per fluorophore as a function of at least one image intensity per fluorophore, which is detected by at least one of the detectors, and because of the existing cross-talk of the detectors, it is even more advantageous to take into account as many image intensities as possible, in particular all image qualities, which are detected by the detectors per fluorophore. In other words, in particular, the detected image intensity per fluorophore is thus integrated over the available detectors.

Further, as an alternative or in addition to mentioned cross-talk of the detectors, the cross-excitation of the fluorophores may be taken into account in the ascertainment of the signal-to-noise ratio per fluorophore, this being accomplished by the image intensity per fluorophore which is detected by one of the detectors being ascertained based also on the excitation of the respective fluorophore by the different light sources available. This takes into account not only the excitation light source directly associated with the respective fluorophore, but also the spectra of the other light sources. In other words, the detected image intensity per fluorophore is integrated over the available light sources.

In the following, these advantageous embodiments of the invention will be described mathematically.

The system is assumed to include K light sources k with $k=0, \ldots, K-1$, I detectors i with $i=0, \ldots, I-1$, as well as J fluorophores j with $j=0, \ldots, J-1$. The number of channels l; i.e., of all possible combinations of light sources and detectors, is then $L=K*I$ with $l=0, \ldots, L-1$. The intensity $I_l$ of a pixel of channel l is then $$I_l = \tau \cdot \Sigma_{j=0}^{J-1} M_{lj} c_j \qquad (1)$$

with the exposure time τ, the mixing matrix $M_{ij}$ and the fluorophore concentrations $c_j$ of the J fluorophores. The entries of the mixing matrix are determined by cross-excitation and cross-emission as $$M_{lj} = \int Em_j(\lambda) \cdot Sens_{i(l)}(\lambda) d\lambda \cdot \int Exc_j(\lambda') \cdot Ill_l(\lambda') d\lambda' \quad (2)$$

with the emission spectrum $Em_j(\lambda)$ and the excitation spectrum $Exc_j(\lambda')$ of the fluorophore j, as well as the spectral sensitivity $Sens_{i(l)}(\lambda)$ of the detector i(l) associated with the channel l and the illumination spectrum $Ill_l(\lambda')$ of the channel l. The illumination spectrum may be composed by superposition of K light sources with individual brightness values, which all have their own spectra $IllLED_k(\lambda')$ and are controlled by a value $P_{kl}$ in the channel l. The integral illumination spectrum is then $$Ill_l(\lambda') = \Sigma_{k=0}^{K-1} IllLED_k(\lambda') \cdot P_{kl} \quad (3)$$

and a sequential mixing matrix $$M_{i(l)jk} = \int Em_j(\lambda) \cdot Sens_{i(l)}(\lambda) d\lambda \cdot \int Exc_j(\lambda') \cdot IllLED_k(\lambda') d\lambda' \quad (4)$$

can be computed, so that the intensity of the pixel is then $$I_l = \tau \Sigma_{j=0}^{J-1} \Sigma_{k=0}^{K-1} M_{i(l)jk} \cdot c_j \cdot P_{kl} \quad (5).$$

The aim is to implement simultaneous detection of the illumination; i.e., one limits oneself to simultaneously readable channels. However, the number thereof is determined by the number of detectors, because a detector can only simultaneously read the channels that reach it, and, therefore, the channels l can thus be identified by the detectors i and the notation can be abbreviated as $I_l \equiv I_i$ and $M_{i(l)jk} \equiv M_{ijk}$. Since only simultaneous illumination will be discussed here, the index l in the $P_{kl}$ can be dropped, and it is possible to put $P_k \equiv P_{kl}$ (sequential illumination is also always possible and included, and thus combinations of channels l which cannot be read simultaneously can also be considered—adjustment of the model is simple, but would complicate the understanding of the notation here). $M_{ijk}$ can be calculated. Thus, equation (5) becomes $$I_i = \tau \Sigma_{j=0}^{J-1} \Sigma_{k=0}^{K-1} M_{ijk} \cdot c_j \cdot P_k \quad (6)$$

The integrally detected intensity per fluorophore (over all detectors) is then $$I_j = c_j \cdot \tau \Sigma_{i=0}^{I-1} \Sigma_{k=0}^{K-1} M_{ijk} \cdot P_k. \quad (7)$$

Thus, in accordance with equation (7), the illumination brightnesses $P_k$ are to be selected such that the image intensities $I_j$ measured for each fluorophore are equal to a setpoint value $I_j^{setpoint}$ corresponding to the desired photoelectrons per pixel, which are selected based on the desired signal-to-noise ratio. As can be seen, in equation (7), integration is performed over the number of the k-light sources and over the number of the i-detectors, so that both the cross-talk of the detectors and the cross-excitation of the fluorophores are taken into account in this example. In principle, it is also possible to take only one of the two effects into account. In this case, the integration would have to be performed only over the number of k-light sources or only over the number of the i-detectors.

In accordance with embodiments of the invention, the optimum selection of the illumination brightnesses can be performed jointly for all light sources and, in particular, when the available detectors are read out simultaneously. However, embodiments of the invention can also be implemented when the different light sources are adjusted sequentially and/or when the different detectors are read out sequentially, the ascertained values of the illumination brightnesses then simply being successively applied to the light sources. A hybrid form for sequential illumination with different superpositions of illumination brightnesses is also possible.

In a possible optimization method, in order to ascertain the illumination brightnesses of the at least two light sources, first, an initial value of the illumination brightness is selected for each of the light sources, and the associated image intensities are measured for each fluorophore, and the respectively associated signal-to-noise ratio is calculated, the illumination brightness values then being successively changed in an iterative process until the respectively selected setpoint of the signal-to-noise ratio is reached for each fluorophore. Changing the illumination brightnesses in this iterative process includes increasing as well as decreasing the illumination brightnesses. It should be noted that in this optimization method, an initial brightness value may also be 0 or may be set to 0 by a change.

In an advantageous embodiment, an image gain of the at least two detectors is taken into account in the ascertainment of the illumination brightnesses of the at least two light sources. For this purpose, a predetermined image gain of a detector is taken as a basis in the ascertainment of the illumination brightnesses or, conversely, appropriate image gains of the detectors are output or set during the ascertainment of the illumination brightnesses. The same applies analogously to the exposure times of the respective detectors. These may, in particular, be selected as fixed values and maintained constant. The above-mentioned parameter "speed" of imaging would then correspond to a predefined fixed value. The value of the exposure time, in turn, can be determined as a function of the image gain of a detector. Conversely, the image gain of a detector can be determined as a function of a predetermined exposure time. Generally, it holds that, given a high exposure time, a lower image gain can be selected, and conversely that, given a high image gain, a lower exposure time can be selected. The parameter "speed" of imaging is generally determined by both settings. In particular, the selection of the image gain may be made dependent on the dynamic range of an analog-to-digital conversion of the detector and the photoelectrons to be expected based on the signal-to-noise setting.

As already explained above, a possible third imaging parameter in accordance with embodiments of the invention is the "load on the sample." Since imaging is generally performed on living samples, care must be taken to ensure that no thermal or photochemical damage occurs due to excessive radiation intensity. One measure of the load on the sample is the bleaching of the dyes.

In accordance with a further aspect, in particular also as an embodiment of the above-mentioned invention, but also independently thereof, it is provided that, during the ascertainment of the illumination brightnesses of the at least two light sources, a bleaching coefficient is determined for each fluorophore. It should be noted that this aspect may be independent of the first-mentioned aspect of taking into account "cross-excitation" and "cross-emission," and that, therefore, protection is to be sought for this aspect separately. Accordingly, within the scope of this disclosure, this second aspect relates to a method for automatically ascertaining illumination brightnesses to be adjusted of at least two light sources for exciting at least one respective fluorophore in a sample to be imaged in a fluorescence microscope, wherein each of the at least two light sources is separately controllable in terms of its illumination brightness, and wherein at least two detectors each detect an image intensity of the microscopically imaged sample, wherein the illumination brightnesses to be adjusted of the at least two light sources are automatically ascertained in such a way that a predefined setpoint of a signal-to-noise ratio is reached for each fluorophore, and wherein during the ascertainment of the illumination brightnesses of the at least two light sources, a bleaching coefficient is determined for each fluorophore.

In particular, in an iterative process for optimizing the setting values of the illumination brightnesses (with or without taking into account cross-excitation and cross-emission), a bleaching coefficient can be mathematically determined (at least approximately) for each fluorophore. Based on the bleaching coefficient determined in this way, bleaching kinetics can be specified for the respective fluorophore concentration $c_j$. A "maximum bleaching level" is reached when this concentration has fallen to a redetermined minimum level. In case the bleaching kinetics is known, this minimum level is associated with a particular period of time until the maximum bleaching level is reached. One possible bleaching kinetics assumes, for example, that the fluorophore concentration falls exponentially with time. The maximum bleaching level can then be calculated from the bleaching coefficient, the ascertained illumination brightnesses, and the detected intensity for each fluorophore.

Because of the relationships mentioned, a termination criterion for the imaging of the sample can be established with respect to the respective fluorophore based on the ascertained maximum bleaching level and the associated corresponding period of time, respectively. Such a termination criterion may provide, for example, that the illumination brightnesses of the respective light sources be lowered when (or before or after) the maximum bleaching level or the associated period of time is reached, it being possible to optionally increase the image gain of the respective detector. For a fluorophore under consideration, it will generally suffice to reduce the directly associated excitation light source, it being possible to increase the image gain and/or the exposure time of the respective directly associated detector to compensate for the reduction of the illumination brightness. In practice, however, especially very short excitation wavelengths also bleach other fluorophores whose excitation lies farther in the red region of the spectrum ("stokes shift"). In such cases, it may also be advantageous to lower the illumination brightnesses of such light sources. When cross-excitation is taken into account, there exists a matrix of the effects that the intensities of the individual light sources have on the excitation of the individual fluorophores, and a matrix of the effects on their bleaching coefficients can be experimentally determined separately or in the course of the adjustment of the signal-to-noise ratio, which makes it possible here to proceed in a very targeted manner.

With the illumination brightnesses newly adjusted in such a way, it is in turn possible to calculate the signal-to-noise ratio for each fluorophore as well as a new maximum bleaching level. The termination criterion may further provide that when a further maximum bleaching level is reached, the illumination brightness of the respective excitation light source or of the respective relevant light sources be reduced to zero to prevent damage to the sample.

In embodiments of the invention, it is convenient if fluorophores and/or light sources which do not influence the detected image intensity are determined during the ascertainment of the illumination brightnesses. This may be the case, for example, when, despite an indication to the contrary by the user and/or by the system, a particular fluorophore is not present in the sample or in the selected field of view or when, for this or another reason, a light source provided has no effect on the detected image intensity.

Furthermore, it is advantageous if, after an objective change in the fluorescence microscope, in order to ascertain the illumination brightnesses of the at least two light sources, a change in the detected image intensities due to this objective change is accounted for by taking into account the imaging conditions into the sample as regards the geometrical flux of the illumination light and the geometrical flux of the fluorescent light imaged by the system onto a detector element. This concerns in particular the system-dependent illumination of the illumination pupil, the magnification of the field stop, the detection cone of the objective, and the size of a detector element imaged into the sample.

In the following, a possible optimization method for optimally ascertaining the illumination brightnesses of the at least two light sources will be briefly described mathematically.

The optimization is performed using, for example, an iterative process according to the Newton-Raphson method:

1. Measure the intensities $I_i^{(0)}$ for an initial illumination setting $P_k^{(0)}$. This is an image acquisition with a (good) starting value for the illumination. Calculate the $M_{ijk}$ from the device spectra and the fluorophore data. In the simplest case, the device spectra are known from the design process or from calibration measurements, just as the fluorophore data is known from calibration data and available, for example, in a database. However, it is also possible to ascertain or improve the matrix entries "on the fly" in the course of the iterative process, such as is typical in quasi-Newton methods (such as BFGS). Generate the target values $I_j^{(\infty)}$, for example, from the Reuleaux control, as explained below, and possibly dye-specific data.

2. Estimate the $c_j^{(n)}$ using a suitable method. This may be linear unmixing or phasor unmixing, which is in principle known from the relevant literature.

3. Calculate the integral intensity for each fluorophore.

4. Estimate the bleaching coefficient for each dye.

5. Calculate the Jacobi matrix of the integral intensity for each fluorophore with respect to the illumination setting by differentiating equation (7) as $$\frac{\partial I_j^{(n)}}{\partial P_k} = \tau \cdot c_j^{(n)} \cdot \sum_{i=0}^{I-1} M_{ijk} \tag{8}$$

6. Analyze the Jacobi matrix to detect light sources which have no effect and absence of fluorophores. If a row is empty, this means that the respective fluorophore is not in the image. If a column is empty, then the respective light source has no effect on the number of detected photoelectrons.

7. Calculate the new illumination setting as a Newton step $$P_k^{(n+1)} = P_k^{(n)} + \sum_{j=0}^{J-1} \left(\frac{\partial I_j^{(n)}}{\partial P_k}\right)_{jk}^{-1} \cdot \left(I_j^{(\infty)} - I_j^{(n)}\right) \tag{9}$$

In this connection, the matrix inversion may be a Moore-Penrose pseudoinverse.

8. Restrict the $P_k^{(n+1)}$ to positive values within the control range. If $P_k^{(n+1)} < 0$, remove the light source k from the solution and put $P_k^{(n+1)} = 0$.

9. Check termination criteria
  a) $I_j^{(\infty)} - I_j^{(n)}$ smaller than tolerance. Adjustment successful.
  b) $P_k^{(n+1)} - P_k^{(n)}$ smaller than tolerance. Adjustment successful.
  c) Jacobi matrix not invertible. Error message, clarify cause. Many causes for non-invertibility can be counteracted just by removing empty rows and columns in step 6. In order to clarify the cause, an error message may be displayed to the user.
  c) excessive bleaching
  d) maximum number of iterations reached.
10. Acquire a new image $I_i^{(n+1)}$ and return to step 2.

An embodiment of the invention further relates to a processing unit adapted to perform a method according to the above-described embodiments of the invention. In this embodiment, the method can be performed fully automatically in the processing unit. Thus, the respective microscope parameters can be ascertained in an extremely user-friendly way. The ascertained values may be displayed and/or be directly set on the respective elements of the fluorescence microscope.

In another embodiment, a computer program is provided having program code for performing a method according to the above-described embodiments of the invention when the computer program is executed on a processor, in particular on the processing unit mentioned.

Finally, embodiments of the invention provide a fluorescence microscope having at least two light sources for exciting at least one respective fluorophore in a sample to be imaged by means of the fluorescence microscope, each of the at least two light sources being separately controllable in terms of its illumination brightness, and further having at least two detectors for detecting a respective image intensity of the microscopically imaged sample, and a processing unit adapted to perform the above-described method according to embodiments of the invention to automatically ascertain the illumination brightnesses to be adjusted of at least two light sources.

If the signal-to-noise ratio per fluorophore is ascertained as a function of the detected image intensities per fluorophore, it is convenient if the processing unit is in communication connection with the detectors of the fluorescence microscope.

It is also convenient if the processing unit is in communication connection with means for automatically adjusting the illumination brightnesses of the at least two light sources in order to adjust the illumination brightnesses in such a way that a predefined setpoint of a signal-to-noise ratio is reached for each fluorophore. In this connection, in order to ascertain the illumination brightnesses of the at least two light sources, cross-talk of a detector for different emission spectra of the fluorophores and/or cross-excitation of a fluorophore for different illumination spectra of the light sources are/is taken into account.

Apart from that, the explanations regarding the method apply analogously to the fluorescence microscope and its embodiments and the resulting advantages.

One option for inputting the three parameters "speed," "image quality," and "sample protection" is provided by the so-called "Reuleaux element" already mentioned. In general terms, this is an input area in the form of a polygon, where the coordinate origins may be vertices or edge midpoints between each two adjacent vertices. Preferred is a curved-sided polygon; i.e., a polygon whose edges are not straight lines but circular arcs about respective vertices opposite thereof. Without limiting generality, in the case of the three parameters under consideration here, this element is embodied, in particular, as a curved-sided triangle or Reuleaux triangle. In the Reuleaux triangle, the distance between each point on an edge and the vertex opposite thereof is constant.

The selection of qualitative parameters, such as "speed," "image quality," and "sample protection," allows for intuitive adjustment without requiring the user to know or understand the technical background. The Reuleaux triangle maps three goals into two dimensions and at the same time illustrates that these goals cannot be achieved simultaneously. In accordance with the present concept, the "image quality" is quantified in the sense of a signal-to-noise ratio, and the "speed" is given by the exposure time used (and/or the gain). The number of detected photons is highly dependent on the sample, the fluorophores used, and the labeling density, so that this observable is optimized in order to achieve the desired value. In this process, the exposure time is maintained and the illumination is adapted. The quantity "sample protection" or "gentle sample imaging" is taken into account as a termination criterion in order not to exceed a certain load on the sample.

The selection of the signal-to-noise ratio may be made directly by the user. However, it is also possible for the user to define the signal-to-noise ratio in a predetermined range. This predetermined range may, for example, be generated or parameterized from a-priori information, such as taking into account an otherwise known susceptibility to bleaching of the fluorophore, the predetermined exposure time, or other criteria. Generally, the selection of the signal-to-noise ratio will always include a compromise of the exposure time and the bleaching behavior, in the framework of which the former is to be maximized.

Thus, in the case of a predetermined "speed;" i.e., here, for example, the exposure time, the user has a certain choice of "image quality," while the load on the sample, which varies dynamically during illumination of the sample, must at the same time remain below a threshold value. In addition, if fluorophores are present which are particularly susceptible to bleaching, the system may itself reduce the target SNR value and/or make other adjustments. Further explanations regarding the Reuleaux triangle, which is advantageously implemented as a graphical user interface (GUI) for controlling the fluorescence microscope, can be gathered from the respective exemplary embodiment.

Further advantages and embodiments of the invention will become apparent from the description and the accompanying drawings.

It will be understood that the aforementioned features and those described below can be used not only in the specified combinations, but also in other combinations or alone without departing from the scope of the invention.

Embodiments of the present invention are schematically illustrated in the drawing with reference to an exemplary embodiment and is described in the following with reference to the drawing.

FIG. 1 shows, in very schematic form, a fluorescence microscope 100 having K light sources $120_k$, k=0, . . . , K−1 for emitting K different excitation wavelengths. Advantageously, these light sources are LEDs or lasers with a suitable spectrum, which may have filters placed downstream thereof, if necessary. In principle, it is also possible to use a broad-band light source, from whose spectrum the desired excitation wavelengths can be sequentially filtered out using a filter wheel or a filter slide. However, one of the great advantages of embodiments of the present invention is that when a plurality of light sources are present, these light sources can be simultaneously adjusted in terms of their illumination brightnesses, which eliminates the need for sequential operation or sequential adjustment.

As shown in FIG. 1, the individual light sources 120$k$ emit an illumination beam 164, which is directed via a spectral splitting element 166 into the objective 160 of microscope 100. This spectral splitting element 166 is a dichroic element which deflects the respective excitation wavelength and which is transparent to the respective fluorescent radiation. The details of the optical system of a fluorescence microscope are shown in FIG. 1 only in very schematic form since they are sufficiently known from the prior art. Illumination beam 164 is directed through objective 160 onto sample 110, where it excites fluorophores 130$_j$, j=0, . . . , J−1 present therein to emit fluorescent radiation. The emitted fluorescent radiation is imaged via objective 160 and possible further imaging elements onto respective detectors 140$_i$, i=0, . . . , I−1. Each light source 120$_k$ that emits an excitation wavelength within the meaning of the present application is associated with a respective fluorophore 130$_j$, which in turn emits fluorescent radiation that is detected by a respective detector 140$_i$. Thus, the J distinguishable fluorophores are associated with I detectors, respectively. Similarly to the light sources, the detectors may be a plurality of individual detectors which may have filters placed upstream thereof, especially since embodiments of the present invention allow the I detectors to be read out simultaneously. In principle, however, it is also possible to operate one or more broadband detectors with respective filter wheels or filter slides, and thus to operate all or some of the detectors sequentially. The detection beam incident on the detectors is denoted by 162.

FIG. 1 shows, by way of example, an epi-fluorescence microscope, but it will be understood that embodiments of the invention may also be implemented on other fluorescence microscope systems, such as light-sheet microscopes, confocal microscopes, multi-photon microscopes, etc.

The illumination brightness $P_k$ ("illumination power"), and thus the emitted power of each light source 120$_k$, is individually adjustable for each light source 120$_k$. In particular, embodiments of the invention allow the illumination brightnesses $P_k$ to be adjusted for all K light sources simultaneously. In the exemplary embodiment considered here, a processing unit 150 is provided for this purpose, the processing unit 150 being in communication or operative connection with the means for adjusting the illumination brightnesses $P_k$ of the light sources. Detectors 140$_i$ detect the distribution of the respective fluorophore in the acquired image of sample 110, and thus a respective image intensity $I_i$. Processing unit 150 is in communication or operative connection with detectors 140$_i$ to be able to receive signals corresponding to the individual image intensities. In accordance with embodiments of the invention, the I detectors can be read out simultaneously.

The illumination brightnesses $P_k$ to be adjusted are then automatically ascertained by processing unit 150 in such a way that a predefined setpoint of a signal-to-noise ratio is set for each distinguishable fluorophore. For this purpose, account is taken of cross-talk of a detector due to other emission spectra of fluorophores which emission spectra are not directly associated with this detector, and of cross-excitation of a fluorophore by other illumination spectra of the light sources which illumination spectra are not directly associated with this fluorophore. In this connection, one measure of the signal-to-noise ratio per fluorophore is the square root of the integrally detected intensity per fluorophore over all detectors in accordance with equation (7).

Figure 2:
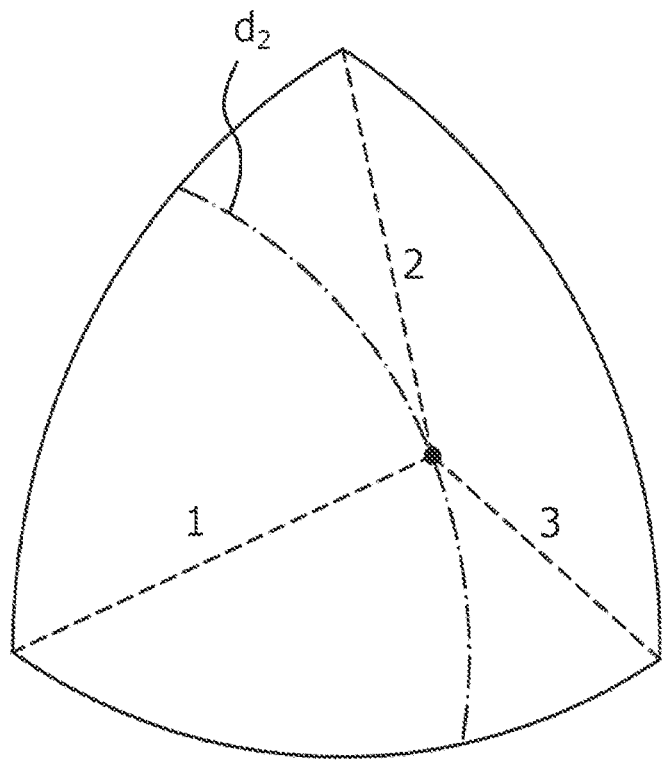
FIG. 2 illustrates a view for setting parameters using a Reuleaux control.

In this exemplary embodiment, the selection of a setpoint value $I_j^{setpoint}$ of the signal-to-noise ratio per fluorophore is made using a Reuleaux triangle, as illustrated in FIG. 2. The Reuleaux triangle shown in FIG. 2 is advantageously displayed to a user of the fluorescence microscope 100 as a graphical user interface (GUI) for controlling the microscope. The coordinate origins of the three parameters "speed," "image quality," and "sample protection" are located at the vertices of the curved triangle. The values of these parameters are denoted in FIG. 2 by 1, 2 and 3, respectively, and are located on a circular arc at an identical distance from the respective coordinate origin. In the example shown, the parameter "speed" is fixedly predetermined by a predetermined value 1 of the exposure time t and/or a predetermined value for the gain. The parameter "sample protection" is here plotted with a minimum value 3, which indicates that the associated bleaching level must always be less than or equal to a maximum bleaching level. In other words, the associated value of the parameter "sample protection" must not fall below the value 3. Thus, only the values on the upper portion of circular arc $d_2$ remain for the value of the parameter "image quality." In this connection, the maximum possible value is 2. It should be noted that the value 3 of the parameter "sample protection" may vary dynamically during imaging in such a way that the range $d_2$ decreases.

The GUI embodied as a Reuleaux triangle thus allows a user to intuitively input a desired setpoint of the image quality, a setpoint for the signal-to-noise ratio being derived from the input value 2, which is in the range $d_2$ (in FIG. 2, the maximum value 2 is shown). If the system should know that fluorophores which are particularly susceptible to bleaching are present in sample 110, then the system may itself select lower values 2 for the image quality. The system; i.e., processing unit 150, determines from the predetermined value 2 a corresponding value of the integrally detected intensity per fluorophore $I_j$, which serves as a setpoint for the illumination brightnesses $P_k$ to be ascertained.

Subsequently, an optimal illumination setting of the K light sources is ascertained, for example, via the above-described iterative process with n steps, starting with an initial illumination setting. In each step, the image intensities $I_j$ per fluorophore (integrated over the detectors) are also ascertained or measured. The above-mentioned iteration steps 2 through 8 are repeatedly performed until one of the termination criteria mentioned in point 9 is met. These criteria include: The measured image intensity per fluorophore differs from the selected setpoint by less than a tolerance value. Furthermore: The difference between the illumination brightness to be newly set for a light source and the illumination brightness set in the preceding step is less than a tolerance value. Furthermore: The Jacobi matrix specified in equation (8) is not invertible. This results in an error message and advantageously in possible error causes being output to the user. Furthermore: A number of iterations determined in advance has been reached. Finally: Excessive bleaching of the sample; in other words, in the case of a dynamic development of the value 3 of the parameter "sample protection," the value range $d_2$ may decrease, so that the illumination brightnesses have to be reduced to prevent damage to the sample. In this case, another termination criterion may be utilized, where the respective illumination brightness or the illumination brightnesses of the relevant light sources is/are reduced and, advantageously, the gains of the involved detectors or at least the gain of the detector that directly detects the respective fluorophore are/is concurrently increased.

Figure 3:
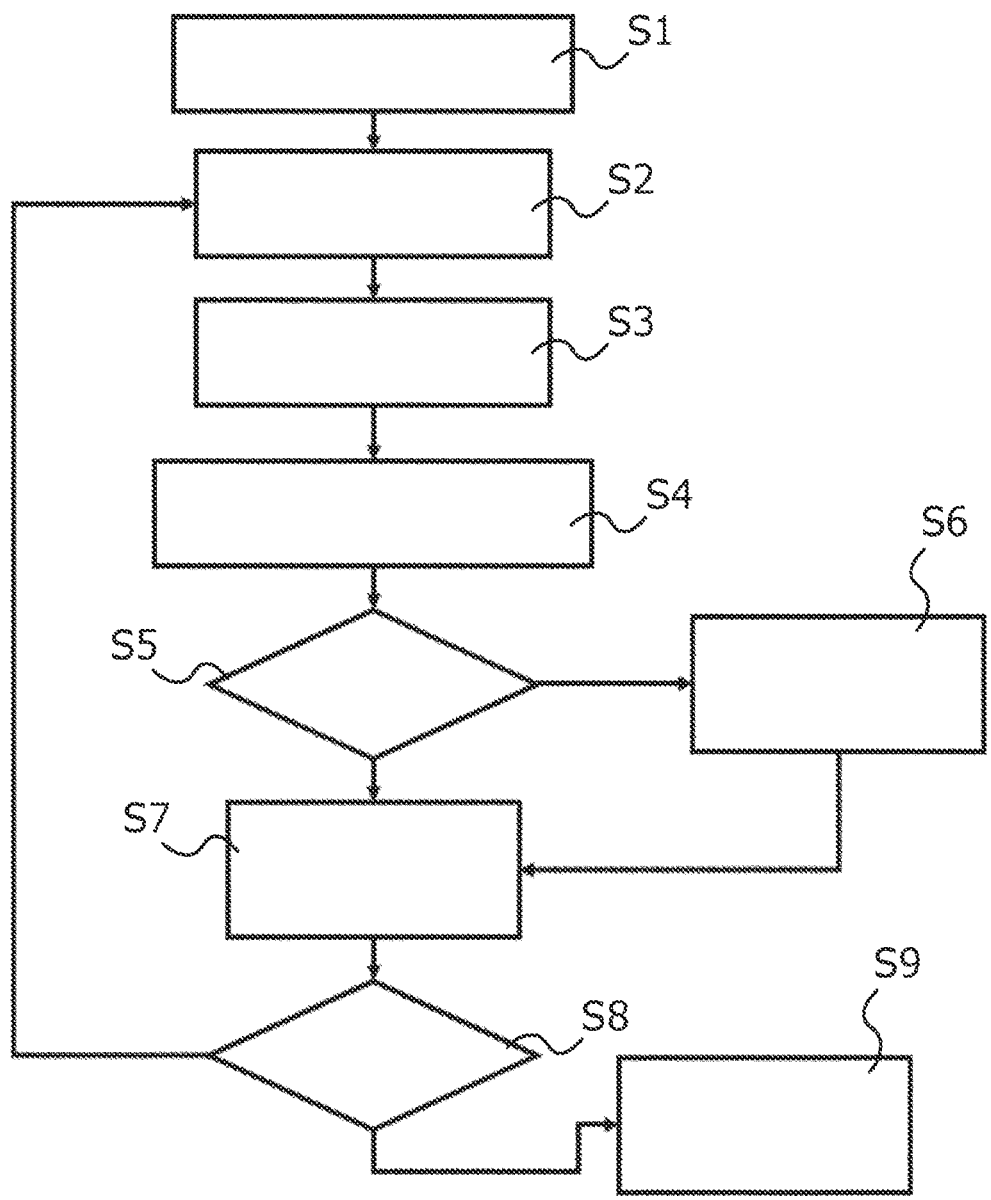
FIG. 3 illustrates a view of an embodiment of a sequence of steps of the method according to an embodiment of the invention.

FIG. 3 illustrates, in the form of a flow chart, an embodiment of the invention for optimizing the illumination brightnesses.

FIG. 3 gives an overview of an embodiment of the invention for adjusting illumination brightnesses of K available light sources $120_k$ in a fluorescence microscope 100 for examining a sample 110 with J distinguishable fluorophores $130_j$, each fluorophore being detected in the form of an image of the sample by one of the I detectors $140_i$. In this regard, reference is made to the explanations given above in connection with FIGS. 1 and 2. In step S1, the following selections are input in particular to processing unit 150, partly by the system and partly by the user: Initial values are selected for the illumination brightnesses, for example, based on manufacturer specifications or by way of a learning algorithm. The coupling matrix M is calculated from the spectra of the light sources, the detection spectra of the detectors, and the fluorophore data. The target values of the image intensities $I_j$ per fluorophore, integrated over the detectors, are generated from the mentioned Reuleaux input (see FIG. 2) and/or based on respective system specifications (dye-specific data). Also defined are the above-mentioned termination criteria.

After the initialization step S1, the system begins to acquire individual detector images, each detecting an image intensity $I_i$ of the microscopically imaged sample 110 for each fluorophore.

In step S3, the concentrations $c_j$ of the respective fluorophores $130_j$ in the sample 110 are estimated, and integral brightnesses $I_j$ are calculated according to equation (7). This equation is derived from the fluorophore concentrations $c_j$, the set exposure time $\tau$, the respectively set illumination brightnesses $P_k$, as well as the mentioned coupling matrix M. Details in this regard have already been discussed above.

In the aforementioned step S3, the bleaching coefficients $\kappa_j$ are advantageously calculated as well. As already emphasized above, this is an aspect which may be used in addition to, but also independently of, cross-emission and cross-excitation in order to ascertain optimal illumination brightnesses. This may be accomplished by comparing the detected $c_j$ in successive images acquired during the optimization process, which are analyzed according to a mathematical model. Thus, based on the relative measurement of the $c_j$ with respect to each other, for example, a zeroth order model may be parameterized from two successive image acquisitions and the associated illumination brightnesses, or a model of the order N−2 may be parameterized from N successive image acquisitions and illumination brightnesses, depending on the embodiment of the model. Of particular importance is a linear model which can be parameterized from three successive image acquisitions using common mathematical methods. After the illumination brightnesses are finally set, specific bleaching kinetics can then be calculated for each fluorophore from the respectively determined bleaching coefficients, and a maximum bleaching level can then in turn be determined from the bleaching kinetics and used as a basis for the parameter "sample protection."

In subsequent step S4, the Jacobi matrix of the integral intensity per fluorophore is calculated according to equation (8). Subsequently, in step S5, it is checked whether this Jacobi matrix contains empty rows or empty columns (the respective light source has no effect on the number of detected photoelectrons.) If this is the case, the respective rows (fluorophores) or columns (light sources) are eliminated; i.e., no longer considered in order to simplify the computational complexity. If step S5 does not lead to any result, the method proceeds with step S7, in which the illumination brightnesses are readjusted according to equation (9).

Then, established termination criteria, such as have already been described in detail above, are checked in step S8. If none of the criteria is met, then the method goes to step n+1 of the iterative process; i.e., the flow chart returns to step S2. However, if one of the termination criteria is met, then the main image acquisition is started in step S9, using the ascertained and set illumination brightnesses $P_k$ of light sources $120_k$.

The method presented here for adjusting the mentioned parameters on a fluorescence microscope is very user-friendly because it operates intuitively and does not require any previous technical knowledge and because it makes the respective adjustments automatically. Moreover, it maps the technical parameter space of the process parameters to parameters of the biological experiment which are of interest to the user.

The term "and/or" includes any and all combinations of one or more of the associated listed items and may be abbreviated as "/".

Although some aspects have been described in the context of a device, it is clear that these aspects also represent a description of the corresponding method, where a block or device corresponds to a method step or a feature of a method step. Analogously, aspects described in the context of a method step also represent a description of a corresponding block or item or feature of a corresponding device.

Some embodiments relate to a microscope that includes a system as described in connection with one or more of the figures. Alternatively, a microscope may be part of a system or connected thereto. FIG. 1 shows in schematic form a system configured to perform a method as described herein. The system includes a microscope 100 and a computer system or processing unit 150. Microscope 100 is configured to acquire images and is connected to computer system 150. The computer system is configured to perform at least a portion of a method as described herein. The computer system may be configured to execute a machine-learning algorithm. The computer system and the microscope may be separate units, but may also be integrated into a common housing. The computer system could be part of a central processing system of the microscope and/or the computer system could be part of a subcomponent of the microscope, such as a sensor, an actuator, a camera, or an illumination unit, etc., of the microscope.

The computer system may be a local computer device (e.g., personal computer, laptop, tablet computer, or mobile phone) having one or more processors and one or more memory devices (i.e., a cloud computing system having one or more processors and one or more memory devices distributed at different locations, such as, for example, at a local client and/or one or more remote server farms and/or data centers). The computer system may include any circuit or combination of circuits. In an exemplary embodiment, the computer system may include one or more processors of any type. As used herein, "processor" may mean any type of computing circuit, such as, for example, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field-programmable gate array (FPGA) of, for example, a microscope or a microscope component (e.g., camera), or any other type of processor or processing circuit. Other types of circuits that may be included in the computer system include a custom-built circuit, an application-specific integrated circuit (ASIC) or the like, such as, for example, one or more circuits (e.g., a communication circuit) for use in wireless devices such as mobile phones, tablet computers, laptop computers, radio phones, and similar electronic systems. The computer system may include one or more memory devices, which may include one or more memory elements suitable for the particular application, such as, for example, a main memory in the form of a random access memory (RAM), one or more hard disks and/or one or more drives that handle removable media such as CDs, flash memory cards, DVDs, and the like. The computer system may also include a display device, one or more loudspeakers, and a keyboard and/or a controller, which may include a mouse, a trackball, a touchscreen, a voice recognition device, or any other device allowing a system user to input information to the computer system and retrieve information therefrom.

Some or all of the method steps may be executed by (or using) a hardware apparatus, such as, for example, a processor, a microprocessor, a programmable computer, or an electronic circuit. In some exemplary embodiments, some one or more of the most important method steps may be executed by such an apparatus.

Depending on certain implementation requirements, embodiments of the invention can be implemented in hardware or in software. The implementation can be performed using a non-volatile storage medium like a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer-readable.

Some exemplary embodiments according to the invention include a data carrier having electronically readable control signals which are capable of cooperating with a programmable computer system such that one of the methods described herein is performed.

Generally, exemplary embodiments of the present invention may be implemented as a computer program product having program code operative to perform any of the methods when the computer program product runs on a computer. The program code may, for example, be stored on a machine-readable carrier.

Other embodiments include the computer program for performing any of the methods described herein, the computer program being stored on a machine-readable carrier.

In other words, an exemplary embodiment of the present invention is therefore a computer program having a program code for performing any of the methods described herein when the computer program runs on a computer.

A further exemplary embodiment of the present invention is therefore a storage medium (or a data carrier or a computer-readable medium) including a computer program stored thereon for performing any of the methods described herein when executed by a processor. The data carrier, the digital storage medium, or the recorded medium are typically tangible and/or non-transitory. Another exemplary embodiment of the present invention is a device as described herein that includes a processor and the storage medium.

A further exemplary embodiment of the invention is, therefore, a data stream or a signal sequence representing the computer program for performing one of the methods described herein. The data stream or the signal sequence may, for example, be configured to be transferred via a data communication connection, for example via the Internet.

A further exemplary embodiment includes a processing means, for example, a computer or a programmable logic device, configured or adapted to perform any of the methods described herein.

A further exemplary embodiment includes a computer on which the computer program for performing any of the methods described herein is installed.

A further exemplary embodiment according to the invention includes a device or a system configured to transfer (for example, electronically or optically) a computer program for performing any of the methods described herein to a receiver. The receiver may be, for example, a computer, a mobile device, a memory device, or the like. The device or the system may include, for example, a file server for transferring the computer program to the receiver.

In some exemplary embodiments, a programmable logic device (e.g., a field-programmable gate array FPGA)) may be used to perform some or all of the functionalities of the methods described herein. In some exemplary embodiments, a field-programmable gate array may cooperate with a microprocessor in order to perform any of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 fluorescence microscope
110 sample
$120_k$ light sources; k=0, . . . , K−1
$130_j$ fluorophores; j=0, . . . , J−1
$140_i$ detectors; i=0, . . . , I−1
150 processing unit
160 objective
162 detection beam
164 illumination beam 166 spectral splitting element
$P_k$ illumination brightness
$c_j$ fluorophore concentration; $j=0, \ldots, J-1$
$d_2$ range for the parameter "image quality"
S1-S9 method steps

The invention claimed is:

1. A method for automatically ascertaining illumination brightnesses to be adjusted of at least two light sources for exciting at least one respective fluorophore in a sample to be imaged in a fluorescence microscope, comprising:
    separately controlling, in terms of illumination brightness, each of the at least two light sources;
    detecting an image intensity of a microscopically imaged sample with at least two detectors; and,
    automatically ascertaining the illumination brightnesses to be adjusted of the at least two light sources in such a way that a predefined setpoint of a signal-to-noise ratio is reached for each fluorophore;
    wherein in order to ascertain the illumination brightnesses of the at least two light sources, cross-talk of a detector for different emission spectra of the fluorophores and/or cross-excitation of a fluorophore for different illumination spectra of the light sources are/is taken into account.

2. The method as recited in claim 1, wherein the signal-to-noise ratio per fluorophore is ascertained as a function of at least one image intensity per fluorophore, which is detected by at least one of the detectors.

3. The method as recited in claim 2, wherein the signal-to-noise ratio per fluorophore is ascertained as a function of an image intensity per fluorophore, which is detected by at least one of the at least two detectors, based on excitation of the respective fluorophore by the at least two light sources.

4. The method as recited in claim 2, wherein the signal-to-noise ratio per fluorophore is ascertained as a function of the image intensities per fluorophore detected by the at least two detectors.

5. The method as recited in claim 2, wherein in order to ascertain the illumination brightnesses of the at least two light sources, first, an initial value of the illumination brightness is selected for each of the light sources, and the associated image intensities are measured, and the associated signal-to-noise ratio per fluorophore is calculated, the values of the illumination brightness then being successively changed in an iterative process until the selected setpoint of the signal-to-noise ratio per fluorophore is reached.

6. The method as recited in claim 1, wherein an image gain of the at least two detectors is taken into account in the ascertainment of the illumination brightnesses of the at least two light sources.

7. The method as recited in claim 1, wherein in order to ascertain the illumination brightness of the at least two light sources, an exposure time is taken into account for each of the detectors.

8. The method as recited in claim 7, wherein the exposure time is maintained constant for each of the detectors.

9. The method as recited in claim 7, wherein the exposure time is determined as a function of the image gain of a detector.

10. The method as recited in claim 1, wherein the detectors are read out simultaneously.

11. The method as recited in claim 1, wherein during the ascertainment of the illumination brightnesses of the at least two light sources, a bleaching coefficient is determined for each fluorophore.

12. The method as recited in claim 11, wherein a maximum bleaching level and/or a period of time until a maximum bleaching level per fluorophore is reached are/is ascertained from the determined bleaching coefficient.

13. The method as recited in claim 12, wherein a termination criterion for the imaging of the sample is established with respect to the respective fluorophore based on the ascertained maximum bleaching level.

14. The method as recited in claim 13, wherein the termination criterion provides that the illumination brightnesses of the respective light sources be lowered.

15. The method as recited in claim 1, wherein fluorophores and/or light sources which do not influence the detected image intensity are determined during the ascertainment of the illumination brightnesses.

16. The method as recited in claim 2, wherein after an objective change in the fluorescence microscope, in order to ascertain the illumination brightnesses of the at least two light sources, a change in the detected image intensities due to the objective change is taken into account.

17. A hardware processor adapted to perform the method according to claim 1.

18. A non-transitory computer-readable medium having program code for carrying out the method according to claim 1 when the program code is executed on a processor.

19. A fluorescence microscope, comprising:
    at least two light sources for exciting at least one respective fluorophore in a sample to be imaged by the fluorescence microscope, each of the at least two light sources being separately controllable in terms of its illumination brightness;
    at least two detectors configured to detect a respective image intensity of the microscopically imaged sample; and
    a processor configured to ascertain the illumination brightnesses to be adjusted in such a way that a predefined setpoint of a signal-to-noise ratio is reached for each fluorophore,
    wherein in order to ascertain the illumination brightnesses of the at least two light sources, cross-talk of a detector for different emission spectra of the fluorophores and/or cross-excitation of a fluorophore for different illumination spectra of the light sources are/is taken into account.

20. The fluorescence microscope as recited in claim 19, further comprising an adjuster configured to adjust the illumination brightnesses of the at least two light sources, wherein the processor is in communication connection with the at least two detectors and with the adjuster in order to set the ascertained illumination brightnesses of the at least two light sources.

* * * * *